United States Patent [19]

Chong et al.

[11] Patent Number: 4,625,244
[45] Date of Patent: Nov. 25, 1986

[54] MULTIPLE REMOTE CONTROL VCR PAUSE SWITCH

[76] Inventors: Lawrence Chong, 506 12th St., Brooklyn, N.Y. 11215; Ha Tom, 71-11 31st Ave., Jackson Heights, N.Y. 11370

[21] Appl. No.: 779,834

[22] Filed: Sep. 25, 1985

[51] Int. Cl.[4] .................. H04N 5/76; H04N 5/782; G09B 7/06

[52] U.S. Cl. .................. 358/335; 360/33.1; 434/350; 434/352

[58] Field of Search ............ 358/335, 908; 360/33.1; 434/350, 351, 352; 369/24

[56] References Cited

U.S. PATENT DOCUMENTS 3,943,641  3/1976  Dworetzky .................. 434/350
3,997,981 12/1976  Tradowsky .................. 434/351
4,422,105 12/1983  Rodesch et al. ............. 358/335
4,450,487  5/1984  Koide ...................... 358/335

Primary Examiner—Raymond F. Cardillo
Assistant Examiner—Hoa T. Nguyen
Attorney, Agent, or Firm—Richard L. Miller

[57] ABSTRACT

A multiple remote control VCR pause switch is provided which allows any number of viewers to pause an accessory video cassette recorder to, for example, answer questions posed on the video tape. Each viewer is provided with a response switch mounted inside a cabinet. A valid first response lamp and an invalid response lamp are provided on a switch console for each response switch. The first viewer to activate his response switch pauses the VCR and causes his valid first response lamp to illuminate. Subsequent activation of any of the remaining response switches has no effect and the invalid response lamps for those response switches stay illuminated. A reset switch is provided and the rewind search may be remotely controlled.

3 Claims, 2 Drawing Figures

MULTIPLE REMOTE CONTROL VCR PAUSE SWITCH

BACKGROUND OF THE INVENTION

The present invention relates generally to the field of entertainment devices and, more specifically, to devices which allow interaction between viewers of a videotape and the video cassette recorder itself.

Video cassette recorders have become ubiquitous and, with their proliferation, applications have arisen in which it has become desirable to pause the videotape in order to, for example, answer questions posed verbally on the tape before resuming the playback of the tape. If a number of viewers wish to respond to a given question it is very difficult to tell who was the first to respond. If each viewer were provided with a response switch, with some automatic identification of the first responder than a question and answer type game would be facilitated.

SUMMARY OF THE INVENTION

It is, therefore, a primary object of the present invention to provide a multiple remote control VCR pause switch which provides each viewer with a response switch which causes the VCR to pause when depressed.

Another object is to provide a multiple remote control VCR pause switch in which a valid first response lamp linked to each response switch, typically green, is illuminated only upon activation by a first responder.

Yet another object is to provide a multiple remote control VCR pause switch in which an invalid response lamp linked to each response switch, typically yellow, remains illuminated unless a first responder has activated the respective response switch.

A further object is to provide a multiple remote control VCR pause switch with a reset switch which resumes normal playback of the video cassette recorder and returns all invalid response lamps to their normally illuminated condition and all valid first response lamps to their off condition.

A yet still further object is to provide a multiple remote control VCR pause switch with a rewind search switch which permits remote control of the VCR's rewind search function.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENTS

Figure 1:
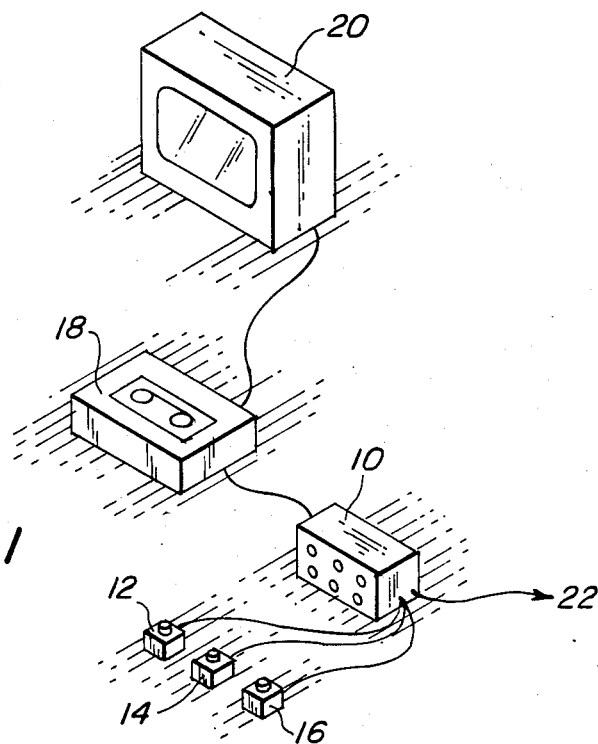
FIG. 1 is a perspective view of the invention installed with a video cassette recorder/player and a TV monitor.

In FIG. 1, the invention 10 is shown with three typical response switches 12, 14, and 16, although any number of response switches could be used. The invention 10 is connected to an accessory video cassette recorder 18 and to a television monitor 20.

Figure 2:
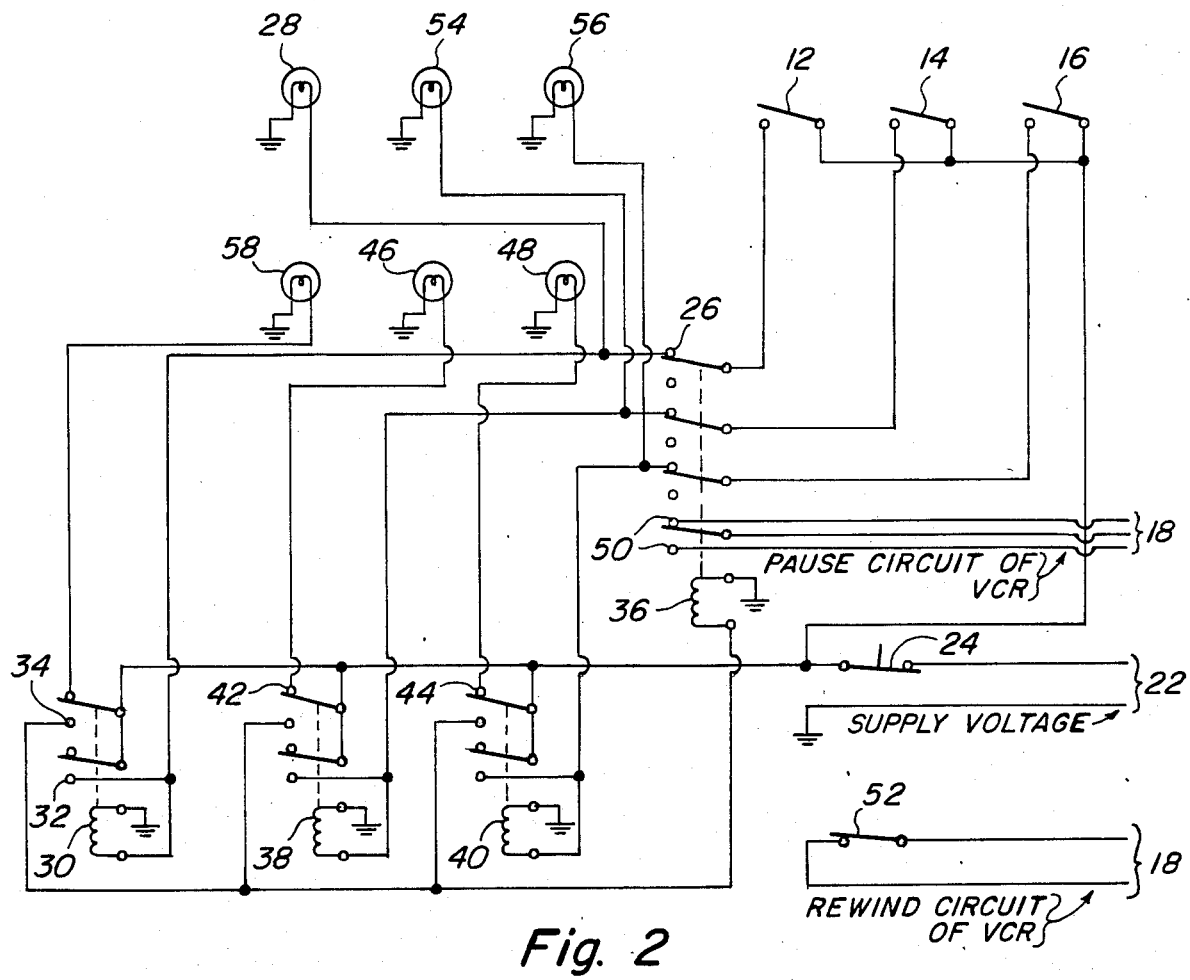
FIG. 2 is a schematic diagram of the electronic circuitry of the invention.

The actual operation of the invention 10 may best be understood with reference to FIG. 2 and by considering the activation of one of the response switches followed by subsequent activation of any of the other response switches.

In order to best understand the operation of the circuit illustrated in FIG. 2 all of the relays are shown in an initial condition with their coils 30, 38, 40, and 36 (reading from left to right in FIG. 2) in an unenergized state, and naturally with their respective normally open contacts open, and their normally closed contacts closed. As a consequence of the relays coil all being in this initial unenergized state it follow that invalid response lamps 58, 46 and 48 will be illuminated by supply voltage inputed at 22, while valid first response lamps 28, 54 and 56 will be extinguished.

Assume that response switch 12, which is a normally-open momentary contact push button switch is activated. At this moment invalid response lamp 58 will be extinguished while simultaneously a supply voltage inputted at 22, is conducted via normally-closed momentary reset switch 24, through response switch 12, through relay contacts 26 to valid first response lamp 28 causing it to illuminate. This same voltage continues to the coil of latching relay 30 whose contacts 32 cause the relay to remain latched on and causing valid first response lamp 28 to remain illuminated even after momentary response switch 12 is released. At the same time, normally open relay contacts 34 cause the coil of relay 36 to activate, thereby preventing the activation of response switches 14 and 16 from activating latching relays 38 and 40 respectively. As long as relays 38 and 40 remain deactivated then their normally closed contacts 42 and 44 respectively keep invalid response lamps 46 and 48 respectively illuminated in spite of the possible activation of response switches 14 and 16. In order to reset latching relay 30, power to all latching relay coils is momentarily interrupted by reset switch 24 and the process may be repeated. It may be seen by analogy that a first activation of any of the response switches 14 or 16 causes its valid first response lamp 54 or 56 respectively to be illuminated while blocking any subsequent response. A set of contacts 50, on relay 36, controls the pause circuits of the accessory VCR 18. A rewind search switch 52 provides remote control of the rewind function of accessory VCR 18 if desired.

While contacts 50, of relay 36, are typically used to control the pause function of a VCR, they may also be used to control computer-based games which are typically more interactive.

While certain novel features of this invention have been shown and described and are pointed out in the annexed claims, it will be understood that various omissions, substitutions and changes in the forms and the details of the device illustrated and in its operation can be made by those skilled in the art without departing from the spirit of the invention.

What is claimed is:

1. Multiple remote control VCR pause switch, comprising in combination:

(a) N momentary contact response switches, each mounted in an individual cabinet, connected to a switching console, wherein said switching console controls the pause and the rewind functions of an accessory video cassette recorder such that when any of said momentary contact response switches is activated said video cassette recorder pauses;

(b) N valid first response lamps, one for each said response switch, such that when the first of said response switches is depressed its respective said valid first response lamp is illuminated; however, any subsequent activation of any of remaining said response switches does not result in the illumination of any remaining said valid first response lamps;

(c) N invalid response lamps, one for each said response switch, such that said invalid response lamps are all normally illuminated until the said first activation of said response switch wherein said respective invalid response lamp is extinguished and all remaining said invalid response lamps remain illuminated;

(d) a momentary contact reset switch which, when activated, causes said accessory video cassette recorder to resume its normal playback feature and also causes all said invalid response lamps to return to their normally illuminated condition; and, (e) a rewind-search switch which remotely activates the rewind-search function of said accessory video cassette recorder.

2. A multiple remote control VCR pause switch, as recited in claim 1, wherein said switching console further comprises an (N+1) pole relay and N latching relays connected such that the activation of any of said response switches causes its respective said latching relay to latch; thereby activating said (N+1) pole relay to prevent any of the remaining said latching relays from activating; each of said valid first response lamps is connected in parallel with the coil of each of said respective latching relays whereby only one valid first response lamp is ever illuminated; and each of said invalid response lamps is connected to a normally-closed set of contacts on each of said respective latching relays whereby each of said invalid response lamps is illuminated except when a first activation of any of said response switch has occurred.

3. A multiple remote control VCR pause switch, as recited in claim 1, wherein said momentary contact reset switch interrupts power to all of said latching relays whereby said latching relays are un-latched.

* * * * *